United States Patent [19]
Marshall

[11] 3,780,832
[45] Dec. 25, 1973

[54] TRAILER BRAKE CONTROL SYSTEM

[75] Inventor: John J. Marshall, Grand Rapids, Mich.

[73] Assignee: Aicheles Associates, Inc., Fort Wayne, Ind.

[22] Filed: July 3, 1972

[21] Appl. No.: 268,748

[52] U.S. Cl. .................................... 188/3 R, 303/7
[51] Int. Cl. ............................................. B60t 13/74
[58] Field of Search ................. 188/3 R, 112; 303/7, 303/20

[56] References Cited
UNITED STATES PATENTS
2,834,434  5/1958  Stuart ................................. 188/3 R
3,574,414  4/1971  Jacob .................................... 303/7

Primary Examiner—Duane A. Reger
Attorney—Marmaduke A. Hobbs et al.

[57] ABSTRACT

A trailer brake control system for use with the hydraulic brake system of an automobile having a brake light and a switch therefor responsive to fluid pressure, in which an adjustable time base circuit is connected to the light switch and produces a signal which is amplified by an amplifier circuit connecting the automobile electrical power supply with a line to the electric brake mechanism in the trailer. A variable resistor controls the time base circuit and is initially adjusted for the type of brakes and loads for synchronizing the operation of the brakes on the towed and towing vehicles for delaying the operation of the trailer brakes until the slower acting hydraulic brakes of the automobile have been applied. An emergency circuit controlled by a switch within easy reach of the driver of the automobile, bypasses both the time base and amplifier circuits to control directly the trailer brakes.

9 Claims, 4 Drawing Figures

TRAILER BRAKE CONTROL SYSTEM

In the conventional electric brake systems for campers, mobile homes and other vehicle trailers, the electric brakes on the trailer are actuated through the hydraulic brake system of the towing vehicle, usually by a switch responsive to the pressure in one of the brake fluid lines. With this type of trailer brake system, a brake line of the towing vehicle must be cut or disconnected in order to insert the fluid pressure switch, often requiring bleeding or otherwise servicing the system to return it to its normal operating condition. This type of work on a hydraulic brake system requires the services of a skilled brake mechanic to assure proper operation of the system; however, the work is often performed by unskilled workmen, and hence the hydraulic brake system is rendered defective, unreliable and unsafe for controlling the braking of either the towing or the towed vehicle. There have been attempts in the past to make the installation easier and capable of being performed by unskilled labor, without tampering with the hydraulic system of the towing vehicle when the electric brake system was being installed. These prior systems of this type have had certain inherent disadvantages which made their installation difficult, unreliable and inconvenient to operate and control under certain conditions. It is therefore one of the principal objects of the present invention to provide a brake system for campers, mobile homes and other types of trailers which can be readily connected to the brake system of the towing vehicle without interfering with the hydraulic portion thereof, and which is efficient and reliable and is not dependent upon the operation of the brake pedal of the towing vehicle for operation of the trailer brakes in an emergency.

Another object of the invention is to provide a trailer brake system which is connected to and actuated by the brake light electrical system of the towing vehicle without any direct connection with either the hydraulic or mechanical portions of the brake system thereof, and which includes a means which momentarily delays the actuation of the trailer brakes so that they will not be applied before the slower responding hydraulic brakes of the towing vehicle are operated.

Still another object of the invention is to provide, in a trailer brake system of the aforesaid type, a manually operated means and circuit which bypasses the principal control means and circuit operated from or through the brake system of the towing vehicle to actuate the trailer brakes directly if the principal system fails or if the trailer develops sway or skid. By applying the trailer brakes with the emergency control and circuit bypass, effective control can be imparted to the trailer without risking the hazard of an accident which frequently occurs when the brakes of the towing vehicle are applied under those conditions.

A further object is to provide a relatively simple solid state control circuit for the aforesaid braking system which is compact and easily installed on any make or model of present day automobiles and connected to the brake system of the trailer, and which, in the remote possibility of failure, will fail safe, permitting the driver to retain effective control over both the towing and towed vehicles.

Additional objects and advantages of the invention will become apparent from the following description and accompanying drawings, wherein.

Figure 1:
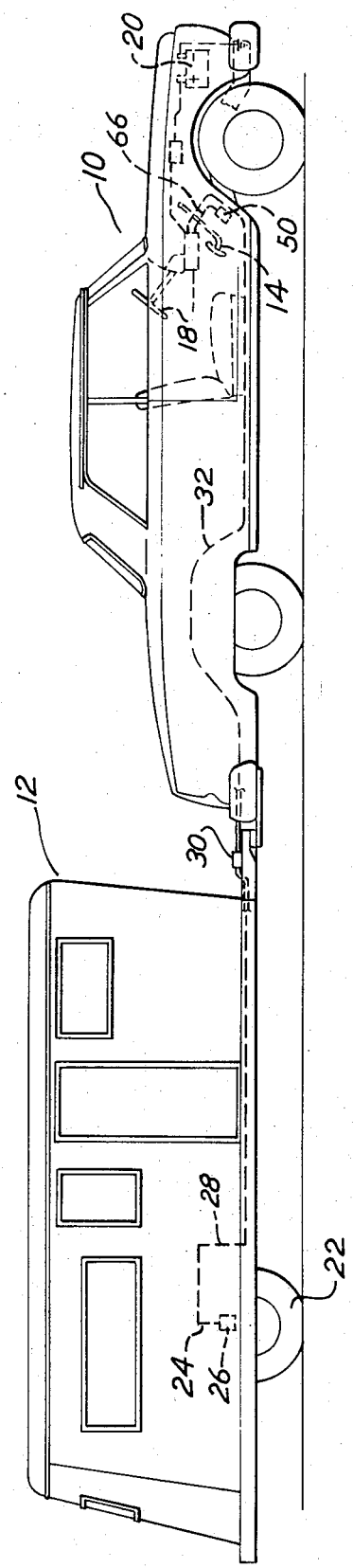
FIG. 1 is a side elevational view of an automobile and a camper being pulled thereby, the brake system of the camper connected to the automobile brake system being shown in phantom.
Figure 2:
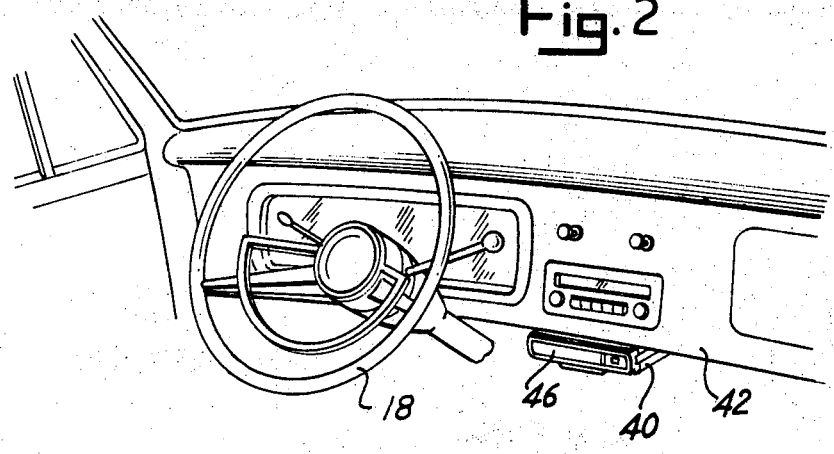
FIG. 2 is a perspective view of the inside of the dashboard of an automobile showing the control box of the electric brake system mounted thereon.
Figure 3:
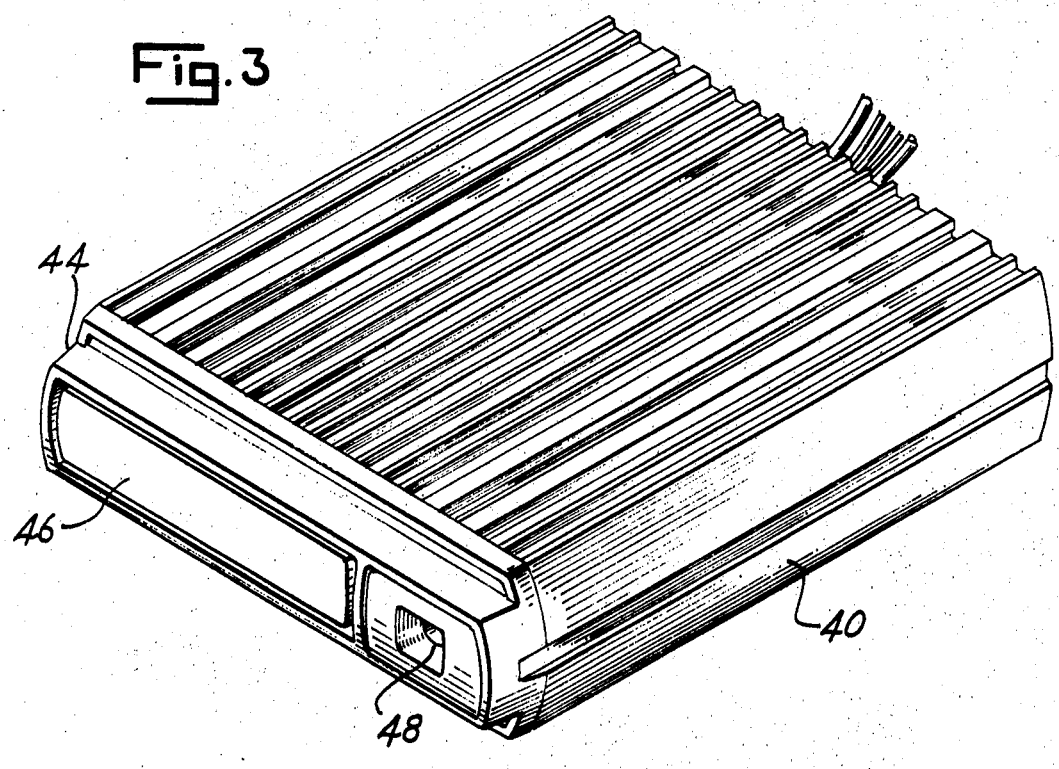
FIG. 3 is an enlarged perspective view of the control box for the brake system.

Referring more specifically to the drawings and to FIG. 1 in particular, numeral 10 designates an automobile, and 12 a camper or other trailer. The automobile has a conventional brake pedal 14, steering wheel 18 and battery 20, and the camper includes an undercarriage having two wheels, indicated by numeral 22, operated by a brake system indicated generally by numeral 24. The brake system of the camper includes an electromagnet 26 controlled by a lead 28 connected to the automobile brake system by a coupling 30 and lead 32. For the purpose of the present description, the automobile and camper may be considered as conventional vehicles, and only relatively minor changes are made in incorporating and installing the present trailer brake control system.

In the control system of the present invention the lead to the brake system is connected into the circuit for the brake light on the rear of the automobile. This connection can be made at any place along the lead from the switch to the light; however, since the parts of the control are installed near the engine or driver's compartment, the connection is preferably made in that part of the automobile. A control box 40 for the present brake control system may be mounted in any convenient place in the driver's compartment, preferably on or in the dashboard or instrument panel 42 of the automobile. The box can be secured by any suitable means such as screws or bolts to the under side of the dashboard with the front panel 44 thereof facing forwardly within easy reach of the driver, since it may be necessary for the driver to operate the brake control system by a manual control such as a bar 46 in the front of panel 44. This bar is pressed inwardly in the event the brakes of the trailer are to be applied independently of the operation of the vehicle brakes, as will be more fully explained hereinafter. A light 48 is preferably included in the system and on the panel 44 to indicate to the driver when the brakes are applied and to some extent the intensity of brake application. The brake switch 50 for controlling the brake lights on the rear of the automobile also controls the operation of the present trailer brake control system when the driver applies the brakes of the automobile through the use of pedal 14. The pressure in the hydraulic system of the automobile actuates brake switch 50 and thereby energizes the trailer brake control system.

Figure 4:
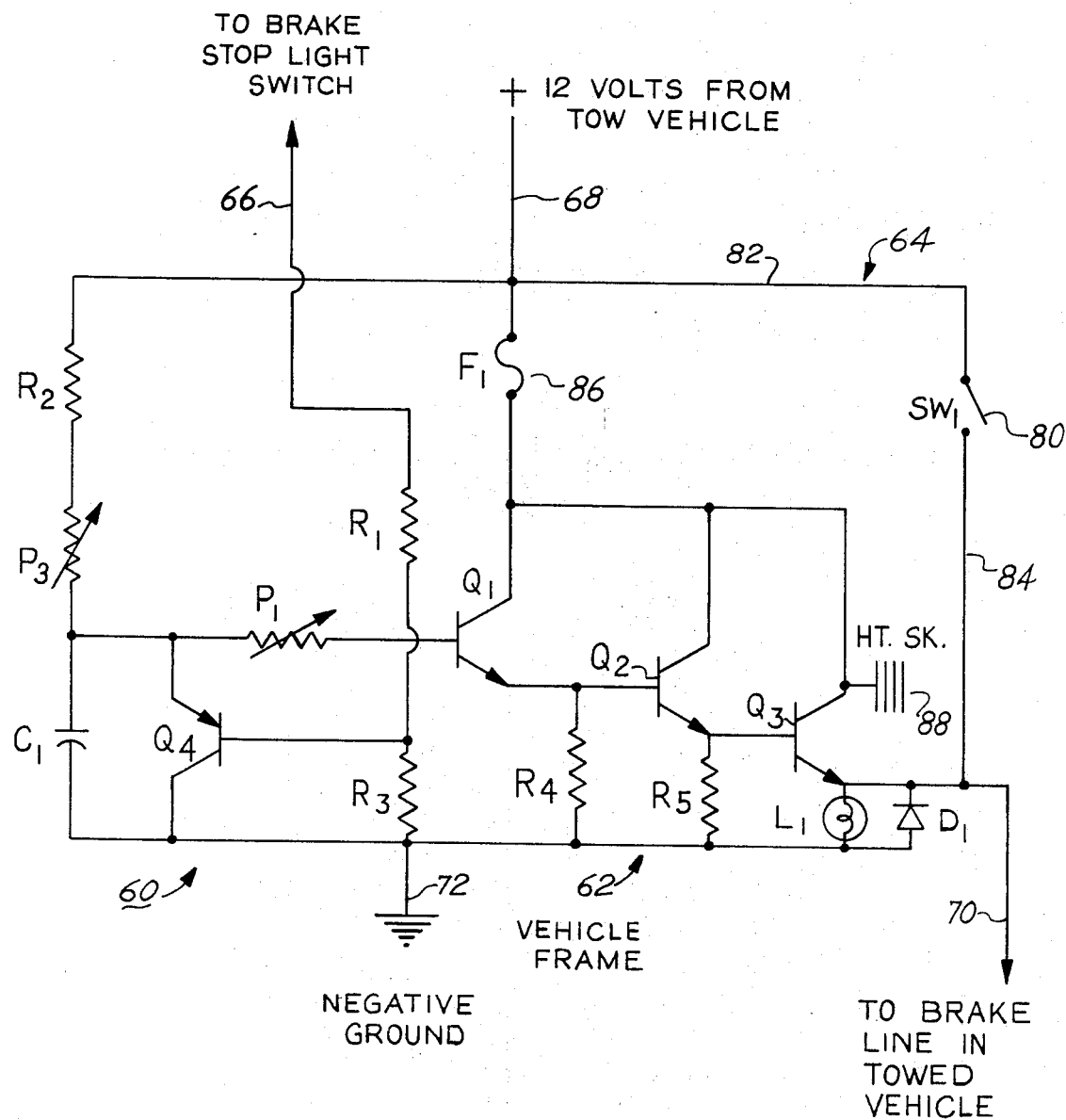
FIG. 4 is a circuit diagram of the brake system embodying the present invention.

The circuitry shown in the diagram of FIG. 4 is primarily contained in box 40 and consists essentially of three basic circuits. The first circuit indicated by numeral 60 is a time base circuit which can be adjusted to give the proper delayed response to compensate for the delay in response of the hydraulic system in the automobile so that the vehicle brakes will not be applied before the automobile brakes are applied. The second basic circuit is the amplifier circuit indicated generally by numeral 62, and the third basic circuit is the emergency manually operated circuit indicated by numeral 64. This latter circuit bypasses the time base and amplifier circuits so that the brakes can be applied even though a failure may have occurred in either of the other two circuits which are responsive automatically to the operation of the hydraulic system of the brakes of the automobile.

In the installation of the box 40 and the circuit shown in FIG. 4, lead 66 is connected to the brake stop light switch 50. The power is supplied from battery 20 to the electric brake system through lead 68, and the system is connected to the brakes on the trailer through lead 70 which is connected to lead 32 shown in FIG. 1. The system is grounded to negative ground by lead 72 to the vehicle frame or other suitable ground structure on the automobile. The designations given the various components in FIG. 4 are standard electronic reference characters and indicate the type and nature of the components involved in the three (3) basic circuits of the system. When the brake pedal is operated, the signal is transmitted through lead 66 to the time base circuit, providing a signal which is amplified by the amplifier circuit 62 from the current supplied through lead 68. The amplified current corresponds to the signal from the time base circuit and is transmitted through leads 70 and 32 to the trailer brakes. The emergency or manually operated system 64 is controlled by a manual switch 80 which is operated by the operator through the use of bar 46 on the front panel of box 40. When switch 80 is closed, the current flows directly through leads 82 and 84 to lead 70, thus bypassing both the time base and amplifier circuits. A fuse 86 and a heat sink 88 are preferably included in the system to obtain the proper degree of safety and operational reliability.

In the operation of the present trailer brake control system shown in the drawings, the operator depresses the brake pedal which actuates brake light switch 50. Since lead 66 is connected to the lead from switch 50 to the rear brake lights of the automobile, the controlled time base circuit is energized. This applies a low current positive voltage to resistor R1 which turns the PNP transistor Q4 off, which has been on and keeping capacitor C1 shorted out. With transistor Q4 off, capacitor C1 is allowed to charge at the rate determined by resistors R2 and P3, and this capacitor builds up and, through variable resistor P1 and transistor Q1, discharges. The current thus produced is amplified by transistor Q1 and, depending on how long the brake is held on, turns transistor Q2 on, which controls a higher current, and this controls transistor Q3 which, in turn, controls the brake magnets in the towed vehicle. Thus a controlled current is applied depending on how long the vehicle brakes are applied.

Variable resistor P3 sets the rate of control and is initially adjusted for types of brakes and loads for synchronizing the operation of the brakes on the towed and towing vehicles. The owner or operator adjusts the sytem to his feel and habits. Variable resistor P1 to some extent controls maximum output current by limiting discharged current to the base of transistor Q1. This is the brake power control. Transistor Q4 is in a unique circuit that shorts out capacitor C1 upon release of the towing vehicle brakes, thus presenting drag in the towed vehicle brakes. The capacitor charges up to 63 percent of applied voltage and discharges 37 percent. This slow discharge slows down the brake release, and if capacitor C1 were not immediately shorted out to stop this decaying current, brake drag would result. Resistor R3 applies a negative bias to keep transistor Q4 on, but resistor R1 applies a positive bias when the brake in the towing vehicle is applied and turns transistor Q4 off, allowing the capacitor C1 to charge. Resistors R4 and R5 are used only to provide a leakage path and aid transistor turn off. Diode D1 is in circuit to suppress the EMF from inductive efforts of brake magnets. Otherwise this back EMF could build up a high reverse voltage when the brake is released and could destroy the transistors if not bypassed by this diode.

Lamp L1 (48) indicates when the brakes are applied and also indicates to some degree the intensity of brake application. Fuse F1 protects the time base and amplifier circuits in case of a short in the transistors or other components or in the external wiring. Switch SW1 (80) controlled by bar 46 is a bypass switch which can be used in an emergency, such as a failure in circuit or for sway or skid control. As an alternative, the switch may be operated by a foot operated device. Heat sink HT. SK. (88) removes most of the heat from the transistors Q2 and Q3 and keeps circuitry temperature at safe operating levels.

From the foregoing description of the present electric trailer brake control system, it is seen that the system can conveniently be installed in a compact package on the dashboard of the automobile and can readily be connected into the lead from the brake light switch 50 so that the present system is energized whenever the brake pedal is depressed, since switch 50 is operated in response to the fluid pressure in the brake system as the pedal is depressed. This system can readily be installed in any make or model of automobile and can easily be connected into the brake system of most campers, mobile homes and other trailers. No special skill or knowledge is required for making the installation, and the hydraulic brake system of the automobile is in no way changed in making the installation, thus avoiding the possibility of failure of the hydraulic system by failing to bleed the line after a connection is made, such as might be encountered in connecting conventional trailer electric brake systems. After the installation has been made, the driver is able to use the emergency control circuit at any time when it is advantageous to do so or in the remote possibility that the remainder of the system fails. This is accomplished by depressing the easily reached bar 46 on the face of the instrument panel 44 of box 40.

While only one embodiment of the present trailer brake control system has been described in detail herein, various changes and modifications may be made without departing from the scope of the invention.

I claim:

1. A trailer brake control system for use with an automobile hydraulic brake system having a brake light and a switch therefor responsive to foot pedal movement: comprising a variable time delay circuit having a variable control means therein including a capacitor and a variable resistor to obtain the desired delay in the operation of the brake mechanism in the trailer relative to the operation of the brake system of the automobile, a lead connecting said circuit to the switch controlling an electrical input line for connection with the brake light, and an amplifier circuit controlled by the automobile electrical power supply through said time delay cricuit and connecting said input line to the trailer brake operating circuit.

2. A trailer brake control system as defined in claim 1, in which an emergency circuit connects said input line to the trailer brake operating circuit and bypasses said first two circuits.

3. A trailer brake control system as defined in claim 2 in which said emergency circuit includes a manually operated switch for location within easyreach of the driver of the automobile.

4. A trailer brake control system as defined in claim 1 in which a lead having a variable resistor therein is connected to said amplifier circuit.

5. A trailer brake control system as defined in claim 2 in which a lead having a variable resistor therein is connected to said amplifier circuit.

6. A trailer brake control system as defined in claim 1 in which said amplifier circuit includes a series of transistors responsive to the signal from the time base circuit.

7. A trailer brake control system as defined in claim 5 in which said amplifier circuit includes a series of transistors responsive to the signal from the time base circuit.

8. A trailer brake control system as defined in claim 1 in which a transistor and resistor prevent the operation of the capacitor until a signal is received from the brake light switch in response to the application of the hydraulic brakes of the automobile.

9. A trailer brake control system as defined in claim 7 in which a transistor and resistor prevent the operation of the capacitor until a signal is received from the brake light switch in response to the application of hydraulic brakes of the automobile.

* * * * *